(12) United States Patent
Miyagaki et al.

(10) Patent No.: US 7,737,213 B2
(45) Date of Patent: Jun. 15, 2010

(54) RESIN COMPOSITION FOR WATER PAINT, WATER PAINT, AND PRODUCTION METHOD FOR RESIN COMPOSITION FOR WATER PAINT

(75) Inventors: Atsushi Miyagaki, Osaka (JP); Haruhiko Murakami, Osaka (JP); Masahito Furo, Fort Lee, NJ (US)

(73) Assignee: DIC Corporation, Tokyo (JP)

( * ) Notice: Subject to any disclaimer, the term of this patent is extended or adjusted under 35 U.S.C. 154(b) by 411 days.

(21) Appl. No.: 11/663,763

(22) PCT Filed: Sep. 27, 2005

(86) PCT No.: PCT/JP2005/017783

§ 371 (c)(1),
(2), (4) Date: Mar. 26, 2007

(87) PCT Pub. No.: WO2006/035789

PCT Pub. Date: Apr. 6, 2006

(65) Prior Publication Data

US 2008/0167424 A1 Jul. 10, 2008

(30) Foreign Application Priority Data

Sep. 28, 2004 (JP) ............................. 2004-281460

(51) Int. Cl.
*C08F 8/10* (2006.01)
*C08F 8/08* (2006.01)
*C08L 67/00* (2006.01)
*C08G 63/40* (2006.01)

(52) U.S. Cl. ................. 524/802; 524/504; 524/599; 523/402; 528/297

(58) Field of Classification Search ............... 524/504, 524/599, 802; 528/297
See application file for complete search history.

(56) References Cited

U.S. PATENT DOCUMENTS

| | | | | |
|---|---|---|---|---|
| 4,179,417 A | * | 12/1979 | Sunada et al. | ............ 525/444.5 |
| 5,124,406 A | * | 6/1992 | Rolando et al. | ............ 525/119 |
| 5,496,589 A | * | 3/1996 | Igarashi et al. | ............ 427/331 |
| 5,696,182 A | * | 12/1997 | Kashiwazaki et al. | ........ 523/161 |
| 6,251,483 B1 | | 6/2001 | Watanabe et al. | |

FOREIGN PATENT DOCUMENTS

| | | |
|---|---|---|
| EP | 0628613 | 12/1994 |
| JP | 52-81344 | 7/1977 |
| JP | 56-133310 | 10/1981 |
| JP | 59-174659 | 10/1984 |
| JP | 60-81262 | 5/1985 |
| JP | 63-20311 | 1/1988 |
| JP | 4-202212 | 7/1992 |
| JP | 5-214290 | 8/1993 |
| JP | 6-184492 | 7/1994 |
| JP | 6-248161 | 9/1994 |
| JP | 6-345825 | 12/1994 |
| JP | 7-292314 | 11/1995 |
| JP | 8-81512 | 3/1996 |
| JP | 9-296023 | 11/1997 |
| JP | 2000-73006 | 3/2000 |
| JP | 2001-49168 | 2/2001 |
| JP | 2001-240793 | 9/2001 |
| JP | 2002-188046 | 7/2002 |
| JP | 2002309162 A * | 10/2002 |
| JP | 2003-119245 | 4/2003 |

OTHER PUBLICATIONS

Supplemental European Search Report dated Oct. 28, 2008, issued on the corresponding European patent application 05 787 710.2.

* cited by examiner

*Primary Examiner*—Tae H Yoon
(74) *Attorney, Agent, or Firm*—Edwards Angell Palmer & Dodge LLP

(57) ABSTRACT

A resin composition for water paint, wherein the resin composition includes water and a vinyl-modified epoxy ester resin (A) which includes a fatty acid chain to which a vinyl polymer portion is combined, and the vinyl polymer portion comprises a structure which includes a carboxyl group at the terminal end represented by the general formula (I), and part of or all of the structure represented by general formula (I) is neutralized with a basic compound.

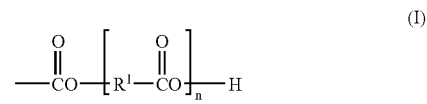

(in the formula, n represents a number of 1 to 10, and $R^1$ represents an alkylene group having 2 to 18 carbon atoms).

17 Claims, No Drawings

RESIN COMPOSITION FOR WATER PAINT, WATER PAINT, AND PRODUCTION METHOD FOR RESIN COMPOSITION FOR WATER PAINT

TECHNICAL FIELD

The present invention relates to a resin composition for water paint, a water paint, and a production method for the resin composition for water paint.

BACKGROUND ART

Paints are used for a variety of products for purposes of adding attractiveness, protecting a substrate or the like. Among them, protection of a substrate is an important function in particular, and there are demands for paints which can form films having different properties in accordance with various uses. For example, regarding a paint which is used for painting metal products such as elements for automobiles, excellent water resistance and corrosion resistance of a film formed from the paint are required in order to prevent corrosion of a metal substrate due to water and the like.

As a paint which can form a film excellent in water resistance and corrosion resistance, it has been known that a paint which includes a vinyl-modified epoxy ester resin and an organic solvent is excellent in adhesion to a metal substrate and can prevent the corrosion of a metal substrate.

However, a large amount of organic solvent is required to be included in the aforementioned paint which includes a vinyl-modified epoxy ester resin and an organic solvent. Accordingly, from the viewpoint of demands for environmental protection and nature conservation in recent years, development of an eco-friendly water paint, wherein only a small amount of organic solvent is used or no organic solvent is used, has proceeded.

Water paints are paints wherein a resin(s) is dissolved or dispersed in an aqueous solvent. For example, as the method for dispersing a resin in an aqueous solvent, a method using an emulsifying agent can be cited. However, such a water paint wherein a large amount of an emulsifying agent is used has a problem in that the water resistance and the corrosion resistance of a film obtained from the water paint are insufficient.

A method wherein large amounts of hydrophilic groups such as a carboxyl group are introduced into a resin to provide dispersibility can also be cited. However, it is necessary to achieve a high acid value such as 50 or more by introducing a lot of hydrophilic groups to a resin in order to disperse the resin under water sufficiently, and therefore there is a problem in that a film excellent in corrosion resistance cannot be formed using this method.

It has been reported that by using predetermined amounts of an organic solvent in water paint, dispersibility of a resin in an aqueous solvent can be maintained and a film having excellent water resistance and corrosion resistance can be formed, even when the introduced amount of hydrophilic groups and the used amount of an emulsifying agent are decreased. (Please refer to Patent Document 1.) The eco-friendly water paints which industry seeks a paint wherein organic solvent is not included or the quantity of organic solvent is extremely small. However, the reported water paint which includes an organic solvent in combination has a problem such that, when the organic solvent is used in an amount of less than 10% by weight, dispersion stability of a pigment greatly deteriorates, and aggregate are generated by particles dispersing under water and precipitates or the like are generated.

Accordingly, a water paint has been sought which can achieve excellent water dispersion stability even when an organic solvent and large amounts of emulsifying agent are not used. It has been reported that an emulsion-polymerized polymer can be obtained such that an acrylic monomer having a long-chain structure including a carboxyl group represented by the general formula (I) described below is neutralized to be used as an emulsifying agent, and the acrylic monomer is emulsion-polymerized with an $\alpha,\beta$-ethylenically unsaturated compound in an aqueous medium to form the emulsion-polymerized polymer; and said emulsion polymerized polymer can show excellent water-dispersion stability even if an organic solvent is not used and a large amount of emulsifying agent is not used. (For example, please refer to Patent Document 2.) However, the aforementioned emulsion-polymerized polymer cannot achieve sufficient water resistance and corrosion resistance of a film obtained from the polymer. Furthermore, dispersion stability of a pigment included in a paint which includes both of the aforementioned emulsion-polymerized polymer and pigment is insufficient, and therefore, there is a problem in that precipitation of pigment is generated with the passage of time.

As described above, various resin compositions have been studied in order to obtain a resin composition which can provide a film excellent in corrosion resistance, and can achieve excellent water dispersion stability even when the quantity of organic solvent or the like used is extremely small. However, such an eco-friendly water paint and a resin composition for water paint wherein the levels required by the industry are satisfied have not been obtained; that is, it has not been possible to reduce the quantity of organic solvent used for a water paint to zero or extremely small, or to obtain excellent dispersion stability of a pigment and a resin and excellent water resistance and corrosion resistance of a film formed by the paint even if such a small amount of organic solvent is used.

Patent Document 1: Japanese Unexamined Patent Application, First Publication, No. 2003-119245

Patent Document 2: Japanese Unexamined Patent Application, First Publication, No. 6-345825

DISCLOSURE OF INVENTION

Problem to be Solved by the Invention

The aims of the present invention are to provide a water paint and a resin composition for water paint which can achieve excellent water resistance and corrosion resistance, and also which are excellent in dispersion stability of a pigment and dispersion stability of a vinyl-modified epoxy ester resin, even when the quantity of organic solvent used for the water paint and the resin composition is zero or extremely small.

Means for Solving the Problem

The present inventors achieved the present invention by way of the following findings.

(1) It is possible to achieve a water paint which can form a film excellent in water resistance and corrosion resistance and is excellent in dispersion stability of a pigment and a vinyl-modified epoxy ester resin. Such a water paint can be obtained by using a resin composition which includes water and a vinyl-modified epoxy ester resin (A) comprising a fatty acid chain to which a vinyl polymer portion is combined, and the vinyl polymer portion has a structure which includes a carboxyl group at the terminal end represented by the general formula (I), and part of or all of the structure represented by the general formula (I) is neutralized with a basic compound. The aforementioned excellent characteristics can be achieved even if an acid value of the resin before neutralization is comparatively low such as about 15 to 40 and the content of the organic solvent therein is zero or extremely small (2) The aforementioned resin composition for water paint can be suitably produced by a method comprising the following steps:

preparing an organic solvent solution of a vinyl-modified epoxy ester resin (A1), wherein the epoxy ester resin is obtained by polymerizing a part of or all of unsaturated bonds of an unsaturated fatty acid-modified epoxy ester resin which is produced by reacting a carboxyl group contained in an unsaturated fatty acid with an epoxy group or both of an epoxy group and a hydroxyl group contained in an epoxy resin, with a vinyl monomer (a1) which has a structure having a carboxyl group at the terminal end represented by following general formula (I), and another vinyl monomer (a2);

preparing water and a basic compound in addition to the organic solvent solution;

neutralizing part of or all of a carboxyl group of the vinyl-modified epoxy ester resin (A1) in the organic solvent solution with the basic compound, in order to form a neutralized product (hereinafter, it may be referred to as a vinyl-modified epoxy ester resin (A)) of the vinyl-modified epoxy ester resin (A1);

mixing water and the organic solvent solution including the neutralized product obtained from the vinyl-modified epoxy ester resin (A1) to conduct a phase-inversion emulsification of the neutralized product under water; and removing part of or all of an organic solvent from the mixture after the phase-inversion emulsification is completed.

That is, the present invention provides a resin composition for water paint, wherein the resin composition includes water and a vinyl-modified epoxy ester resin (A) which includes a fatty acid chain to which a vinyl polymer portion is combined, and the vinyl polymer portion comprises a structure which includes a carboxyl group at the terminal end and is represented by the general formula (I)

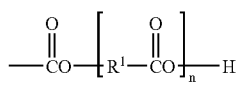

(in the formula, n represents a number of 1 to 10, and $R^1$ represents an alkylene group having 2 to 18 carbon atoms), and part of or all of the structure which includes a carboxyl group at the terminal end represented by the general formula (I) is neutralized with a basic compound.

The present invention also provides a water paint which includes the aforementioned resin composition for water paint and a pigment.

Furthermore, the present invention provides a production method for the resin composition for water paint, which comprises:

preparing an organic solvent solution of a vinyl-modified epoxy ester resin (A1), wherein an unsaturated fatty acid-modified epoxy ester resin is obtained by reacting a carboxyl group contained in an unsaturated fatty acid with an epoxy group or both of an epoxy group and a hydroxyl group contained in an epoxy resin, and part of or all of an unsaturated bond of the unsaturated fatty acid-modified epoxy ester resin is polymerized with a vinyl monomer (a1) which has a structure having a carboxyl group at the terminal end represented by the following general formula (I) and another vinyl monomer (a2) to form the vinyl-modified epoxy ester resin (A1)

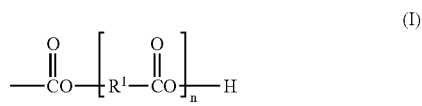

(in the formula, n represents a number of 1 to 10, and $R^1$ represents an alkylene group having 2 to 18 carbon atoms);

using a basic compound and water in addition to the organic solvent solution, conducting neutralization of part of or all of a carboxyl group of the vinyl-modified epoxy ester resin (A1) included in the organic solvent solution using the basic compound to form a neutralized product of the vinyl-modified epoxy ester resin (A1), and conducting mixing of water and the organic solvent solution which includes the neutralized product obtained from the vinyl-modified epoxy ester resin (A1) to conduct a phase-inversion emulsification of the neutralized product under water; and removing part of or all of an organic solvent included in the mixture after the phase-inversion emulsification.

EFFECT OF THE INVENTION

A resin composition for water paint of the present invention and a resin composition for water paint which can be produced by the production method of the present invention can achieve very excellent dispersion stability of a pigment and a vinyl-modified epoxy ester resin for water paint even when the content of organic solvent in the resin composition is zero or very small, and furthermore, it is possible to form a film excellent in water resistance and corrosion resistance when the resin composition is used for a water paint.

BEST MODE FOR CARRYING OUT THE INVENTION

First, a vinyl-modified epoxy ester resin (A) is explained below, in which the resin includes a fatty acid chain to which a vinyl polymer portion is combined, and the portion comprises a structure represented by the general formula (I) which includes a carboxyl group at the terminal end, and part of or all of the structure is neutralized with a basic compound (hereinafter, the aforementioned vinyl-modified epoxy ester resin (A) may be described as a "vinyl-modified epoxy ester resin (A)").

The structure represented by the general formula (I) including a carboxyl group at the terminal end is essential for the vinyl-modified epoxy ester resin (A) of the present invention. The reason is that it is necessary to disperse a pigment and the vinyl-modified epoxy ester resin (A) stably in water due to the neutralization of part of or all of the structure conducted by a basic compound and to maintain excellent water resistance and corrosion resistance of a produced film.

It is well known that it is possible to achieve a stable dispersion, even in an aqueous medium wherein the content of organic solvent is extremely small, due to the introduction of a hydrophilic group into a vinyl-modified epoxy ester resin using an acrylic acid or the like. Such an introduction can control the acid value to, for example, about 50 or more.

However, large amounts of hydrophilic groups are included in the above vinyl-modified epoxy ester resin due to the high acid value thereof, and the corrosion resistance and the like of a film obtained therefrom tend to deteriorate.

On the other hand, the vinyl-modified epoxy ester resin (A) used in the present invention can disperse stably in water due to neutralization thereof, and a pigment can also be dispersed stably. Such an effect is possible even if the acid value of the resin before the neutralization of a carboxyl group conducted by a basic compound is comparatively small, for example, even if acid value before the neutralization is 15 to 40 (mgKOH/g). Furthermore, due to the use of a water paint including such a vinyl-modified epoxy ester resin having a low acid value, a film further excellent in water resistance and corrosion resistance can be formed.

The vinyl-modified epoxy ester resin (A) used in the present invention may be any resin insofar as it is a resin which includes a fatty acid chain to which a vinyl polymer portion is combined; and the vinyl polymer portion comprises a structure represented by the general formula (I) wherein a carboxyl group is included at the terminal end; and part of or all of the structure which includes a carboxyl group at the terminal end and is represented by the general formula (I) is neutralized with a basic compound. Examples of the structure wherein a carboxyl group is included at the terminal end include a structure represented by the general formula (I) wherein n represents 2 and $R^1$ represents an alkylene group having 5 carbon atoms.

There is no limitation regarding the manufacturing method or the like of the vinyl-modified epoxy ester resin. For example, the resin can be preferably prepared using the following method. An epoxy group of an epoxy resin or both of an epoxy group and a hydroxyl group of an epoxy resin are reacted with a carboxyl group of an unsaturated fatty acid to prepared an unsaturated fatty acid-modified epoxy ester resin. Then, part of or all of an unsaturated bond of the unsaturated fatty acid-modified epoxy ester resin is polymerized with a vinyl monomer (a1) which comprises a structure having a carboxyl group at the terminal end represented by the general formula (I), and another vinyl monomer (a2) in order to form a vinyl-modified epoxy ester resin (A1). Subsequently, part of or all of a carboxyl group of the obtained vinyl-modified epoxy ester resin (A1) is neutralized with a basic compound to form a target vinyl-modified epoxy ester resin (A).

Examples of the aforementioned epoxy resin include; a bisphenol type epoxy resin, an alicyclic type epoxy resin, a phenol novolak type epoxy resin, a polyethylene glycol type epoxy resin and epoxidized polybutadiene resin. These resins may be used singly or in combination of two or more. Among the epoxy resins, the bisphenol type epoxy resin is preferable, since a film excellent in corrosion resistance can be formed from the bisphenol type epoxy resin.

Examples of the bisphenol type epoxy resin usable in the present invention include a bisphenol A type epoxy resin, a bisphenol F type epoxy resin, a bisphenol AD type epoxy resin and a bisphenol S type epoxy resin. Among them, the bisphenol A type epoxy resin is particularly preferable from the viewpoint of forming a film which has excellent corrosion resistance.

Examples of the bisphenol A type epoxy resin include EPICLON 850, 1050, 3050, 4050, 7050, HM-091 and HM-101 (these resins are manufactured by Dainippon Ink and Chemicals Incorporated).

Examples of the bisphenol F type epoxy resin include EPICLON 830 (manufactured by Dainippon Ink and Chemicals Incorporated).

Example of the alicyclic type epoxy resin include UNOX 201 and 289 (manufactured by US Union Carbide Corporation).

Examples of the phenol novolak type epoxy resin include EPICLON N-740 and 775 (these resins are manufactured by Dainippon Ink and Chemicals Incorporated).

Examples of the polyethylene glycol type epoxy resin include EPIKOTE 812 (manufactured by Shell corporation (Holland)), EPOLIGHT 40E, 200E and 400E (manufactured by Kyoeisha Chemical Co., Ltd).

Examples of the epoxidized polybutadiene resin include BF-1000 (manufactured by Adeka Argus Corporation).

It is preferable to use an epoxy resin which has an epoxy equivalent included in the range of 400 to 1000 (g/equivalent), more preferably in the range of 400 to 800 and still more preferably in the range of 400 to 600, from the viewpoint of obtaining a water paint which can display excellent film forming ability at ordinary temperature.

The contents of the aforementioned structure originated from the epoxy resin are not limited in particular. It is preferable that the contents of the structure originated from the epoxy resin be in the range of 15 to 75% by weight based on the total amounts of the vinyl-modified epoxy ester resin (A) used in the present invention, more preferably in the range of 20 to 70% by weight, and most preferably in the range of 25 to 60% by weight. Due to controlling the contents of the structure in the range, a paint which is excellent in film forming ability can be formed, and a film excellent in corrosion resistance can be formed.

Hereinafter, an unsaturated fatty acid which is reacted with an epoxy group and/or a hydroxyl group of the aforementioned epoxy resin is explained.

Examples of the unsaturated fatty acid which can react with the epoxy resin include oleic acid, linolic acid, linolenic acid, eleostearic acid, recinoleic acid and the like, and fatty acids such as tung oil fatty acid, linseed oil fatty acid, dehydrated-castor-oil fatty acid, castor oil fatty acid, tall oil fatty acid, cotton-seed-oil fatty acid, soybean oil fatty acid, olive-oil fatty acid, safflower oil fatty acid and rice-bran oil fatty acid. These acids can be used singly or in combination of two or more if required. Among them, a semi-drying oil or drying oil such as dehydrated-castor-oil fatty acid and soybean oil fatty acid having an iodine value of 120 to 200 is preferably used, since a vinyl monomer described below can be graft-polymerized with an unsaturated bond included in the unsaturated fatty acid efficiently.

The contents of the structure originated from the aforementioned unsaturated fatty acid is not limited in particular. The structure originated from the unsaturated fatty acid is preferably included in the vinyl-modified epoxy ester resin (A) such that the content of the structure originated from the unsaturated fatty acid is in the range of 15 to 50% by weight, and more preferably in the range of 15 to 40% by weight and most preferably in the range of 20 to 35% by weight. Due to controlling the contents of the structure in the range, the drying property of a painted film at ordinary temperature, pigment dispersibility and corrosion resistance of the obtained film can be improved.

The aforementioned unsaturated fatty acid can be used in combination with another carboxylic acid insofar as the purpose of the present invention can be achieved.

Examples of said other carboxylic acid include octylic acid, lauric acid, stearic acid and the like, and saturated fatty acid such as hydrogenated coconut oil fatty acid, coconut oil fatty acid, and palm oil fatty acid, phthalic acid (anhydride), isophthalic acid, terephthalic acid (anhydride), trimellitic acid (anhydride), pyromellitic acid (anhydride), tetrachloro phthalic acid (anhydride), 1,1-cyclohexane dicarboxylic acid, 1,3-cyclohexane dicarboxylic acid, 1,4-cyclohexane dicarboxylic acid, tetrahydro phthalic acid (anhydride), chlorendic acid (anhydride), HIMIC acid (anhydride) (a registered tradename of Hitachi Chemical Co., Ltd.), hydrogenated trimellitic acid (anhydride), adipic acid, azelaic acid, sebacic acid, maleic acid (anhydride), fumaric acid, itaconic acid, octenoic acid, isononanic acid, benzoic acid, p-tert-benzoic acid, isooctenoic acid, isodecanoic acid, cyclohexane acid, acrylic acid, and methacrylic acid. These acids may be used singly or in combination of two or more if required.

The aforementioned unsaturated fatty acid-modified epoxy ester resin can be produced by, for example, an esterification reaction between an epoxy group and/or secondary hydroxyl group of the epoxy resin and a carboxyl group of the unsaturated fatty acid, wherein the epoxy resin and the unsaturated fatty acid are heated at 150 to 250° C. to conduct dehydration in the presence of an esterification catalyst which is used if needed.

Examples of the esterification catalyst usable in the aforementioned esterification reaction include metal compounds of titanium, zircon, hafnium, aluminium, tin, zinc, magnesium and the like. Preferable examples thereof include titanium tetraisopropoxide and titanium tetrabutoxide and the like. The amount of esterification catalyst usable in the present invention is not limited in particular. It is preferable that the amount of catalyst is in the range of 10 to 800 ppm, more preferably 20 to 500 ppm, and most preferably 30 to 300 ppm based on the total amounts of the epoxy resin and the unsaturated fatty acid.

It is preferable that dimethyl benzyl amine, triethylamine or the like be used, if suppression of a side reaction such as an etherification is required when the unsaturated fatty acid-modified epoxy ester resin is produced.

A polyhydric alcohol can be used when the epoxy resin is reacted with the unsaturated fatty acid in the present invention.

Examples of the polyhydric alcohol usable in the present invention include ethylene glycol, propylene glycol, 1,3-butylene glycol, 1,4-butylene glycol, 1,6-hexamethylene glycol, diethylene glycol, dipropyrene glycol, neopentyl glycol, triethylene glycol, cyclohexane dimethanol, hydrogenated bisphenol A, glycerol, trimethylol ethane, trimethylol propane, pentaerythritol, dipentaerythritol and sorbitol. These compounds may be used singly, or in combination of two or more if required.

When the aforementioned polyhydric alcohol is used, an unsaturated fatty acid-modified epoxy ester resin can be manufactured by mixing the epoxy resin, the unsaturated fatty acid and the polyhydric alcohol to conduct an esterification reaction.

Before the neutralization is conducted, the vinyl-modified epoxy ester resin (A) used in the present invention comprises an acidic group such as a carboxyl group which is included in the structure having a carboxyl group at the terminal end represented by the general formula (I). Accordingly, even if the vinyl-modified epoxy ester resin (A) before the neutralization has a small acid value such as about 15 to 40 (mgKOH/g), which is smaller than the conventional acid value such as 50 or more, the resin composition of the present invention can be dispersed stably in an aqueous medium which includes no or very small amounts of organic solvent, and furthermore a pigment can also be dispersed in the aqueous medium stably. The acid value of the vinyl-modified epoxy ester resin (A) before the neutralization can be selected suitably if required.

As the case may be, an acid value other than the aforementioned acid value of 15 to 40 can also be used. The acid value of the vinyl-modified epoxy ester resin (A) is preferably in the range of 10 to 60, more preferably 10 to 40, and most preferably 20 to 30.

A part of or all of the structure having a carboxyl group at the terminal end represented by the general formula (I) is neutralized by a basic compound, when the modified epoxy ester resin (A) is dispersed under water. The basic compound usable for the neutralization is not limited in particular. Examples of the basic compound include: methylamine, dimethylamine, trimethylamine, ethylamine, diethylamine, triethylamine, 2-aminoethanol, 2-dimethylaminoethanol, ammonia, sodium hydroxide, potassium hydroxide, tetramethyl ammonium hydroxide, tetra-n-butyl ammonium hydroxide, trimethyl benzyl ammonium hydroxide and the like. These basic compounds can be used as an aqueous solution thereof such as an aqueous solution of ammonia. A volatile basic compound and aqueous solution thereof such as aqueous ammonia, triethylamine, 2-dimethylaminoethanol and the like is preferably used as the aforementioned basic compound, since the volatile basic compound can be volatilized and does not remain when a film is formed with a water paint comprising the vinyl-modified epoxy ester resin (A) and therefore a film excellent in water resistance and corrosion resistance can be formed.

The vinyl monomer (a1) comprising the structure having a carboxyl group at the terminal end represented by the general formula (I) is not limited in particular. Examples thereof include: 2-methacryloxyethyl succinic acid, 2-methacryloxyethyl hexahydrophthalate, 2-methacryloxyethyl glutamate and ω-carboxyl polycaprolactone methacrylate. These compounds may be used singly or in combination of two or more if needed.

The vinyl monomer (a1) which comprises the structure having a carboxyl group at the terminal end represented by the general formula (I) can be preferably produced by following methods. (a) A method wherein a radical-polymerizable unsaturated compound which comprises a carboxyl group is reacted with a hydroxyl carboxylic acid. (b) A method wherein a radical-polymerizable unsaturated compound which comprises a carboxyl group is reacted with ω-caprolactone in the presence of an acid catalyst and the like. From a viewpoint of suppressing the occurrence of a byproduct and the like, it is preferable that the vinyl monomer (a1) be manufactured by the aforementioned method (b).

The method (b) is a method wherein ω-caprolactone and a radical-polymerizable unsaturated compound having a carboxyl group are mixed and stirred to react them at the temperature of 40 to 150° C. in the presence of an acid catalyst.

The radical-polymerizable unsaturated compound comprising a carboxyl group used in the method (b) is not limited in particular. Examples of the unsaturated compound include acrylic acid, methacrylic acid, itaconic acid, maleic acid and the like. Examples of the acid catalyst include p-toluene sulfonic acid, benzene sulfonic acid, aluminium chloride and stannic chloride. The amounts of the acid catalyst can be selected suitably if required. It is preferable that the acid catalyst be used in the range of 1 to 20 parts by weight based on the amounts (100 parts by weights) of the radical-polymerizable unsaturated compound comprising a carboxyl group.

It is preferable that the vinyl monomer comprising a functional group represented by the general formula (I) obtained by the aforementioned method include a structural unit originated from ε-caprolactone, such that the number of structural units included is in the range of 1 to 10 and more preferably 1 to 5 on average per one molecule. Specific examples of the vinyl monomer having a functional group include a vinyl monomer ARONICS M-5300 (trade name, manufactured by Toagosei Co., Ltd.), wherein the average number of structural units originated from ε-caprolactone per one molecule is two.

The weight ratio of the structure having a carboxyl group at the terminal end represented by the general formula (I), wherein part or all of the structure is neutralized by a basic compound and it is included in the vinyl-modified epoxy ester resin (A) used in the present invention, is not limited in particular. It is preferable that the weight ratio of the structure be 0.5 to 30% by weight, more preferably 0.5 to 22% by weight, and most preferably 2 to 17% by weight. When the weight ratio of the structure is included in the range, it is possible to obtain a resin composition for water paint which is excellent in the dispersion stability of the vinyl-modified epoxy ester resin (A) and a pigment and which can provide excellent corrosion resistance and corrosion resistance.

The vinyl-modified epoxy ester resin (A) used in the present invention comprises the structure having a carboxyl group at the terminal end(s) represented by the general formula (I), wherein a part of or all of the structure is neutralized by the basic compound. In addition to the structure, it is preferable that the vinyl-modified epoxy ester resin (A) used in the present invention also comprises a polyalkylene oxide structure represented by the following general formula (II) in the vinyl polymer portion.

(II)

(In the general formula, m represents a number of 3 to 90, $R^2$ represents an alkylene group having two to four carbons, and $R^3$ represents a hydrogen atom or a methyl group.)

The polyalkylene oxide structure represented by an general formula (II) can be introduced into the aforementioned vinyl polymer portion. Such introduction can be conducted such that a vinyl monomer (a21) which includes a polyalkylene oxide structure represented by the general formula (II) is used as part of or all of the aforementioned other vinyl monomer (a2), when part of or all of the unsaturated bond included in the unsaturated fatty acid-modified epoxy ester resin is reacted with the vinyl monomer (a1), which comprises the structure having a carboxyl group at the terminal end represented by the general formula (I), and the other vinyl monomer (a2).

Examples of the vinyl monomer (a21) which includes the polyalkylene oxide structure represented by the general formula (II) include monomers which can be obtained by an addition reaction between a vinyl monomer having a hydroxyl group and alkylene oxide such as ethylene oxide and propylene oxide. Specific examples thereof include methoxy polyethylene glycol (meth)acrylate.

It is preferable that "m" included in the general formula (II) of the polyalkylene oxide structure represented by the general formula (II) be in the range of 10 to 100, more preferably 10 to 60 and most preferably 10 to 30, since excellent dispersion stability of a vinyl-modified epoxy ester resin (A) and a pigment is achieved and an excellent film having excellent corrosion resistance can be formed.

The weight ratio of the group represented by the general formula (II) in the vinyl-modified epoxy ester resin (A) is preferably 0.5 to 10% by weight, more preferably 1 to 8% by weight, and most preferably 2 to 5% by weight. When the weight ratio is controlled to be in the range, it is possible to obtain a resin composition for water paint wherein excellent dispersion stability of the vinyl-modified epoxy ester resin (A) and the pigment is achieved and an excellent film having excellent corrosion resistance can be formed.

Examples of the other vinyl monomer (a2) other than the vinyl monomer (a21) which has the polyalkylene oxide structure represented by the general formula (II) include monocarboxylic acids comprising an unsaturated double bond such as (meth)acrylic acid, 2-carboxylethyl acrylate, crotonic acid, vinyl acetate, monovinyl adipate, monovinyl sebacate, monomethyl itaconate, monomethyl maleate, monomethyl fumarate, mono-[2-(meth)acryloyl oxy ethyl]succinate, mono-[2-(meth)acryloyl oxy ethyl]phthalate, mono-[2-(meth)acryloyl oxy ethyl]hexahydro phthalate; dicarboxylic acids which comprise an unsaturated double bond such as itaconic acid, maleic acid and fumaric acid; alkyl (meth)acrylates such as methyl (meth)acrylate, ethyl (meth)acrylate, n-propyl (meth)acrylate, n-butyl (meth)acrylate, iso-butyl (meth)acrylate, tert-butyl (meth)acrylate, 2-ethyl hexyl (meth)acrylate, lauryl (meth)acrylate, octadecyl (meth)acrylate, docosanyl (meth)acrylate, cyclopentyl (meth)acrylate, cyclohexyl (meth)acrylate, bornyl (meth)acrylate, isobornyl (meth)acrylate, dicyclopentanyl (meth)acrylate, and cycloalkyl alkyl (meth)acrylates;

aromatic vinyl compounds such as styrene, p-tert-butyl styrene, α-methyl styrene and vinyl toluene; ω-alkoxyl alkyl (meth)acrylates such as 2-methoxy ethyl (meth)acrylate and 4-methoxy butyl (meth)acrylate; vinyl monomers having a tertiary amide group such as N,N-dimethyl (meth)acrylamide; (meth)acrylates having a hydroxyl group such as 2-hydroxy ethyl (meth)acrylate and 2-hydroxy propyl (meth)acrylate; vinyl ethers having a hydroxyl group such as 2-hydroxy ethyl vinyl ether, 4-hydroxy butyl vinyl ether and 6-hydroxy hexyl vinyl ether; N-methylol (meth)acrylamides; vinyl monomers having a secondary amino group such as N-methyl amino ethyl (meth)acrylate; vinyl monomers having an active methylene group such as vinyl acetoacetate, 2-acetoacetoxy ethyl (meth)acrylate; vinyl monomers having a hydrolysable silyl group such as vinyl trimethoxy silane and 3-(meth) acryloyloxy propyl trimethoxy silane; vinyl monomers having a silyl ester group such as trimethyl silyl (meth)acrylate; vinyl monomers having an epoxy group such as glycidyl (meth)acrylate, methyl glycidyl (meth)acrylate, 3,4-epoxy cyclohexyl (meth)acrylate, glycidyl vinyl ether and allyl glycidyl ether; and vinyl monomers having an isocyanate group such as 2-isocyanate propene, 2-isocyanate ethyl vinyl ether, 2-isocyanate ethyl methacrylate and m-isopropenyl-α,α-dimethyl benzyl isocyanate. These compounds may be used singly or in combination of two or more if required.

Furthermore, it is possible to use a product which is obtained by an addition reaction between, for example, ε-caprolactone and the aforementioned vinyl monomer having a hydroxyl group as the aforementioned other vinyl monomer (a2).

As described above, a manufacturing method and the like of the vinyl-modified epoxy ester resin (A) usable in the present invention is not limited. For example, the vinyl-modified epoxy ester resin (A) can be produced such that: the aforementioned unsaturated fatty acid-modified epoxy ester resin is polymerized with a vinyl monomer (a1) which comprises the structure having a carboxyl group at the terminal end represented by the general formula (I), and another vinyl monomer (a2) in order to obtain a vinyl-modified epoxy ester resin (A1); and then, part of or all of a carboxyl group included in the structure having a carboxyl group at the terminal end represented by the general formula (I) of the obtained vinyl-modified epoxy ester resin (A1) are neutralized by a basic compound. A solution-polymerization method is preferably used for the aforementioned method.

As the aforementioned solution-polymerization method, the following method can be cited for example. A vinyl monomer (a1) which comprises the structure having a carboxyl group at the terminal end represented by the general formula (I), and another vinyl monomer (a2) are added dropwise continuously—or added all at once in a vessel which includes an organic solvent, a radical polymerization initiator and the aforementioned unsaturated fatty acid-modified epoxy ester resin. Then, the mixture is maintained at the temperature of 50 to 150° C., preferably 80 to 150° C., for 3 to 20 hours, preferably 4 to 10 hours, under the pressure of 1 to 100 $kg/cm^2$, preferably 1 to 10 $kg/cm^2$, to manufacture a vinyl-modified epoxy ester resin (A1). When the aforementioned solution-polymerization method is conducted, it is preferable that non-volatile contents in the vessel be 30 to 90% by weight and more preferably 70 to 90% by weight.

Examples of a radical polymerization initiator usable for the polymerization of the vinyl-modified epoxy ester resin (A1) in the solution polymerization method include: azo compounds such as 2,2'-azobis(isobutyronitrile), 2,2'-azobis(2,4-dimethylbutyronitrile), azobiscyano valeric acid; organic peroxide such as tert-butyl peroxypivalate, tert-butyl peroxy benzoate, tert-butyl peroxy-2-ethyl hexanoate, di-tert-butyl peroxide, cumene hydroperoxide, benzoyl peroxide and t-butyl hydroperoxide; inorganic peroxide such as hydrogen peroxide, ammonium persulfate, potassium persulfate and sodium persulfate. These compounds can be used singly or in combination of two or more.

The radical polymerization initiator is not limited in particular, but it is preferable that the radical polymerization initiator be used in the range of 0.1 to 10 parts by weight based on the total amounts (100 parts by weight) of a vinyl monomer (a1) and another vinyl monomer (a2).

Examples of an organic solvent usable in the solution polymerization method include:

aliphatic or alicyclic hydrocarbon solvents such as n-hexane, heptane, n-octane, cyclohexane and cyclopentane; aromatic hydrocarbon solvents such as benzene, toluene, xylene and ethyl benzene; ester solvents such as ethyl acetate, n-butyl acetate and ethylene glycol monomethyl ether acetate; ketones such as acetone, methyl ethyl ketone, methyl isobutyl ketone, methyl n-amyl ketone and cyclohexanone; ether solvents such as diethylene glycol dimethyl ether, diethylene glycol dibutyl ether, ethylene glycol monobutyl ether, propylene glycol monopropyl ether, propylene glycol monobutyl ether, 1,2-dimethoxy ethane and tetrahydrofuran; alcohol solvents such as methanol, ethanol, propanol, isopropanol, n-butanol, i-butanol, sec-butanol, tert-butanol and 3-methoxy-3-methyl butanol; freon type solvents such as carbon tetrachloride, methylene dichloride and hexafluoro isopropanol; N-methylpyrrolidone, dimethyl formamide, dimethyl acetamide and ethylene carbonate.

When the aforementioned solution-polymerization method is conducted, a chain transfer agent or the like can be used if needed. Examples thereof include alkyl mercaptans such as n-octyl mercaptan, n-dodecyl mercaptan and t-dodecyl mercaptan; aromatic mercaptans such as benzyl mercaptan and dodecyl benzyl mercaptan; thiocarboxylic acids such as thiomalic acid and salts thereof; and alkyl esters.

The vinyl-modified epoxy ester resin (A) used in the present invention preferably has the number average molecular weight of 1,000 to 100,000, more preferably 2,000 to 50,000, and most preferably 3,000 to 10,000. When the vinyl-modified epoxy ester resin (A) has the number average molecular weight within the range, it can disperse underwater stably and it is possible to form a film which is excellent in water resistance and corrosion resistance. The softening point or glass transition point of the vinyl-modified epoxy ester resin (A) is not limited and suitable points can be selected if needed. A preferable softening point thereof is in the range of −20 to 100° C., more preferably −20 to 70° C., and most preferably −10 to 40° C. A preferable glass transition point is in the range of −20 to 100° C., more preferably −10 to 60° C., and most preferably 0 to 40° C.

Examples of the vinyl-modified epoxy ester resin (A) used in the present invention include those having an acid value of 5 to 100. It is preferable that the acid value of the resin (A) be 15 to 40, and more preferably 20 to 35. When the acid value is included in the range, an excellent film which is excellent in pigment dispersibility, corrosion resistance and water resistance can be formed.

A method for dispersing the aforementioned vinyl-modified epoxy ester resin (A) under water is not limited in particular. Examples of the method include a phase-inversion emulsification method preferably, which can be conducted as follows. Neutralization of part or all of a carboxyl group contained in a vinyl-modified epoxy ester resin (A1) is conducted by a basic compound using an organic solvent solution, in which the vinyl-modified epoxy ester resin (A1) is dissolved, and furthermore, a phase-inversion emulsification of the neutralized product obtained from the vinyl-modified epoxy ester resin (A1) under water is conducted by mixing water and the organic solvent solution of the neutralized product (which is equal to a vinyl-modified epoxy ester resin (A), and hereinafter may be described as a vinyl-modified epoxy ester resin (A).) of the vinyl-modified epoxy ester resin (A1).

The phase-inversion emulsification is preferably conducted as follows. After obtaining an organic solvent solution of a neutralized product of the vinyl-modified epoxy ester resin (A1) due to the neutralization of part or all of the carboxyl groups contained in the vinyl-modified epoxy ester resin (A1) conducted by a basic compound, water and the organic solvent are mixed to conduct a phase-inversion emulsification of the neutralized product of the vinyl-modified epoxy ester resin (A1) under water. On the other hand, it is also possible to conduct simultaneously a neutralization of part or all of the carboxyl groups and a phase-inversion emulsification of a vinyl-modified epoxy ester resin (A1). That is, a basic compound and an organic solvent solution in which the vinyl-modified epoxy ester resin (A1) is dissolved are mixed with each other, or an organic solvent solution in which the vinyl-modified epoxy ester resin (A1) is dissolved and water in which a basic compound is included are mixed with each other.

Examples of the basic compound usable in the aforementioned phase-inversion emulsification method include those described above. Among them, a volatile basic compound and an aqueous solution thereof such as aqueous ammonia, triethylamine, 2-dimethylamino ethanol and the like are preferably used, and aqueous ammonia is more preferably used. The reason is that these compounds do not remain in a film since they can be volatilized when the film is formed, and such a film is excellent in water resistance and corrosion resistance.

When the aforementioned vinyl-modified epoxy ester resin (A) is dispersed in water in the phase-inversion emulsification method, it is preferable that equipment such as a dispersing device (disper), homogenizing-mixer and the like be used if required.

The aqueous dispersion of the vinyl-modified epoxy ester resin (A) obtained by the phase-inversion emulsification method contains an organic solvent. Accordingly, it is preferable that part or all of the organic solvent contained in the dispersion be removed. There is no limitation in particular regarding a method for removing part or all of the organic solvent from the aqueous dispersion. For example, a method wherein the organic solvent is removed under reduced pressure or the like is preferable. In the aforementioned method, the organic solvent is removed until the content of the organic solvent therein becomes less than 10% by weight in general. It is preferable that removal be conducted until the content of the organic solvent becomes 0 to 8% by weight, more preferably 0 to 5% by weight, and most preferably 0 to 3% by weight from a viewpoint of reducing environmental load. When the content of an organic solvent included in the aqueous dispersion obtained by the phase-inversion emulsification method is already less than 10% by weight, such removal is not necessarily required. However, it is preferable that part or all of the organic solvent be removed from the aqueous dispersion even in such a case.

Examples of a method for dispersing a vinyl-modified epoxy ester resin (A) under water other than the aforementioned phase-inversion emulsification method include; a method wherein a neutralized product of a vinyl-modified epoxy ester resin (A1) is dispersed under water such that a vinyl-modified epoxy ester resin (A1) is mixed and stirred mechanically with water which is heated and pressurized and includes a basic compound, or a dissolved neutralized product of a vinyl-modified epoxy ester resin (A1) is mixed and stirred mechanically with water which is heated and pressurized.

When a vinyl-modified epoxy ester resin (A) is dispersed in water, an emulsifier can be used in order to improve the dispersion stability of a vinyl-modified epoxy ester resin (A) and a pigment, insofar as the purpose of the present invention is not affected.

Examples of the emulsifier include: nonionic emulsifiers such as polyoxyethylene alkyl ether, polyoxyethylene alkyl phenyl ether and a copolymer of polyoxyethylene and polyoxypropylene; anionic emulsifiers such as alkyl sulfate salt, alkyl benzene sulfonate, polyoxyethylene alkyl ether sulfate salt and polyoxyethylene alkyl phenyl ether sulfate salt; and cationic emulsifiers such as quaternary ammonium salts. In order to prevent the decrease of water resistance and corrosion resistance of an obtained film, it is preferable that emulsifier not be used in the dispersion.

The obtained resin composition for water paint of the present invention is a composition wherein particles of the vinyl-modified epoxy ester resin (A) are dispersed in an aqueous medium. The particle diameter of the dispersed particles is not limited in particular. It is preferable that the diameter thereof be 40 to 200 nm, more preferably 60 to 175 nm, and most preferably 80 to 150 nm. The particle diameter used in the present invention is a value which can be evaluated with a microtrac grain size analyzer (MICROTRAC 9340-UPA, manufactured by Nikkiso Co., Ltd.).

It is possible to add an organic solvent in the resin composition for water paint of the present invention which is obtained as described above, in order to improve a film forming property and coating ability. The total amount of the organic solvent(s) to be added is less than 10% by weight in general, preferably in the range of 0 to 8% by weight, more preferably 0 to 5% by weight, and most preferably 0 to 3% by weight. Examples of the organic solvent include those usable for the aforementioned solution polymerization method of the vinyl-modified epoxy ester resin (A1).

The resin composition for water paint of the present invention can be applied effectively to a paint used for coating a metal substrate. Particularly, it is very effective for a rustproof paint used for coating a metal substrate, which is required to have excellent water resistance and corrosion resistance.

Next, a water paint of the present invention is explained below.

A water paint of the present invention is a water paint which comprises the aforementioned resin composition for water paint and a colorant such as a pigment. If required, dye can be used as a colorant, and dye and pigment can be used in combination. However, when pigment is used in the water paint, excellent effects can be obtained. Said water paint can be obtained by, for example, adding pigment in the resin composition for water paint of the present invention and then mixing them with mixing equipment such as a ball mill, a sand mill, a high-speed impeller, a three-roll mill or the like. If required, additives such as a metal drier, a leveling agent, an ultraviolet absorbent, an antioxidant and the like and other resins such as an aqueous resin can be added and mixed to form a water paint.

The aforementioned pigment is not limited in particular. Examples thereof include carbon black, metal oxides such as titanium oxide, magnesium oxide, zinc oxide and iron oxide, inorganic pigments such as aluminum flake, mica, silicates, barium sulfate and calcium carbonate and organic pigments such as phthalocyanine blue, phthalocyanine green, quinacridone, benzimidazolone, threne, perylene and the like. These pigments can be used singly or in combination of two or more optionally.

When a water paint of the present invention is used as a rustproof paint, a rust-proofing pigment is preferably used. Examples of the rust-proofing pigment include chromate compounds such basic lead chromate, zinc chromate, strontium chromate and barium chromate; lead compounds such as calcium plumbate, red lead and lead cyanamide; phosphate compounds such as zinc phosphate, aluminium tripolyphosphate and zinc phosphite; molybdate compounds such as basic zinc molybdate and calcium molybdate; borate compounds such as barium metaborate, calcium metaborate and calcium borosilicate; iron oxide compounds such as mica-like iron oxide and iron oxide compounds represented by the formula $MeO.Fe_2O_2$ (in the formula, M represents a bivalent metal atom selected from calcium, strontium, barium, magnesium, zinc and manganese); and tungstate compounds such as zinc tungstate and calcium tungstate.

The amount of the aforementioned pigment is not limited in particular. The pigment is preferably used in an amount such that the weight concentration of a pigment (PWC) is 65% by weight or less, more preferably 0.1 to 50% by weight, and most preferably 1 to 40% by weight. When the pigment is used in the range, the deterioration of corrosion resistance of an obtained film can be prevented.

When the aforementioned rustproof pigment is used, it is preferable that PWC be 40% by weight or less, more preferably 0.1 to 35% by weight, and most preferably 0.1 to 30% by weight. When the pigment is used in the range, the deterioration of water resistance of an obtained film can be prevented.

The aforementioned ultraviolet absorbent is not limited in particular. Examples thereof include benzotriazole compounds, oxalic acid anilide compounds and hydroxybenzophenone compounds. The aforementioned antioxidant is not limited in particular. Examples thereof include hindered amine compounds, hindered phenol compounds and phosphorus compounds. The amounts of the ultraviolet absorbent and an antioxidant can be selected if needed. These agents can be preferably used in an amount of 0.5 to 5 parts by weight based on the amount of non-volatile components (100 parts by weight) included in the water paint of the present invention.

The aforementioned other resins are not limited in particular. Examples thereof include vinyl acetate resins, styrene-butadiene resins, styrene-acrylonitrile resins, acrylic resins, fluoroolefin resins, modified silicone vinyl polymers, polyvinyl alcohols, polyester resins, polyurethane resins, phenol resins, melamine resins, epoxy resins, alkyd resins, polyamide resins, polyether resins, silicon resins, animal proteins, starches, cellulose derivatives, dextrin and gum arabic.

In the water paint of the present invention, if the vinyl-modified epoxy ester resin (A) is unsaturated and includes a double bond, a metal drier can be preferably used as a curing catalyst. If the metal drier is used, it is possible to form a film which has further excellent water resistance and corrosion resistance.

Examples of the metal drier include metallic compounds such as tetraisopropyl titanate, dibutyltin dilaurate, dibutyltin acetate, dibutyltin dioctate and cobalt naphthate.

The amount of the metal drier is not limited in particular. It is preferable that the amounts of the metal drier be in the range of 0.1 to 10 parts by weight based on the vinyl-modified epoxy ester resin (A) (100 parts by weight), and more preferably 1 to 10 parts by weight. If the amount of the metal drier is included in the range, a film excellent in water resistance and corrosion resistance can be formed.

The viscosity of the water paint of the present invention is preferably 20 to 200 seconds when it is determined with FORD CUP No. 4 under the temperature condition of 25° C., more preferably 35 to 170 seconds, and most preferably 50 to 150 seconds.

The water paint of the present invention can form a film by, for example, coating the water paint of the present invention on a substrate and then drying it.

A coating method for coating the water paint is not limited in particular. Examples thereof include a spray method, an electrostatic method and an electrodeposition method. Coating and drying of a water paint can be conducted suitably by selecting suitable conditions to achieve a suitable thickness of a dried and cured film.

A drying method conducted after coating is not limited. Examples thereof include a method wherein drying is conducted for one to ten days at ordinary temperature and a method wherein drying is conducted for 30 seconds to three hours at the temperature of 40 to 250° C.

A substrate which can be coated by the water paint of the present invention is not limited in particular. Examples thereof include substrates such as a metal substrate, a plastics substrate, a wood substrate, a glass substrate, a slate substrate, paper and rubber, which can be used generally in various fields. Surface treatments such as metal plating can be performed on a surface of the substrate.

Examples of materials used for the aforementioned metal substrate include iron, nickel, aluminium, copper, lead, chromium, zinc, tin, magnesium, titanium, alloys thereof, stainless steel and brass. Surface treatments such as metal plating can be performed on a surface of a substrate obtained by using the materials.

Examples of an inorganic substrate used as the substrate include ceramics, glass and the like, which can be obtained by sintering metal oxide such as alumina, silica and zirconia, and concrete, mortar, an asbestos cement slate, autoclaved light-weight concrete (ALC), dolomite plaster, gypsum plaster and calcium silicate board.

Examples of the plastic substrate include substrates formed from a thermoplastic resin such as polystyrene, polycarbonate, polymethylmethacrylate, ABS resin, polyphenylene oxide, polyurethane, polyethylene, polyvinylchloride, polypropylene, polybutylene terephthalate and polyethylene terephthalate and substrates formed from a thermosetting resin such as an unsaturated polyester resin, an epoxy resin, a phenol resin, crosslink type polyurethane, a crosslink type acrylic resin and a crosslink type saturated polyester resin.

Any form of the substrate can be selected and used if needed. For example, examples thereof include various forms such as a plate-like form, a spherical form and a film-like form.

A painted material obtained by coating the water paint of the present invention can have a film excellent in corrosion resistance and the like. Any material can be painted using the water paint of the present invention insofar as problems are not caused. Examples of the material include an automobile, a motorcycle, a train, a bicycle, a ship, a vessel, an airplane, a television, a radio, a refrigerator, a washing machine, an air conditioner, an outdoor unit of the air conditioner, a computer and parts consisting of metal, plastic and the like which are used for the aforementioned materials, a tile, a roof material, a wall material, a window frame, a door, a road, a road sign, a guardrail, a bridge, a tank, a chimney and a building.

EXAMPLES

Hereinafter, the Present Invention is Explained in Detail Using Examples and Comparative Examples Example 1

In a four-necked flask equipped with a thermometer, a stirrer, a thermoregulator and a nitrogen introduction tube, 160 parts by weight of dehydrated castor oil fatty acid, 161 parts by weight of soybean oil fatty acid, 322 parts by weight of EPICLON 1050 (bisphenol A type epoxy resin, manufactured by Dainippon Ink and Chemicals Incorporated), 7 parts by weight of maleic anhydride and 0.3 parts by weight of triethylamine were added and heated to 180° C. while stirring. Then, the temperature of the mixture was further raised to 230° C. to undergo esterification while a dehydration state was observed. When an acid value of the resin became 10 (mgKOH/g) or less, the mixture was cooled to 100° C., and 293 parts by weight of methyl isobutyl ketone was further added thereto to obtain a solution of an unsaturated fatty acid-modified epoxy ester resin.

Next, the internal temperature in the flask as a reaction vessel was maintained at 120° C., and then, 95 parts by weight of styrene, 95 parts by weight of isobutyl methacrylate, 160 parts by weights of ARONIX M5300 (an acrylic monomer which comprises a structure including a terminal end carboxyl group represented by the aforementioned general formula (I) wherein n=2 and $R^1$ represents an alkylene group having 5 carbons, manufactured by TOAGOSEI Co., Ltd.), 20 parts by weight of t-butyl peroxy benzoate, and 20 parts by weight of methyl isobutyl ketone were added over three hours. The reaction was further continued for five hours at the same temperature to obtain a solution of vinyl-modified epoxy ester resin (A1) having an acid value of 34 (mgKOH/g).

Subsequently, the obtained solution was cooled to 40° C., and 88 parts by weight of a 25% by weight aqueous ammonia solution was added into the reaction vessel in order to neutralize the solution of vinyl-modified epoxy ester resin (A1) and obtain a solution of a vinyl-modified epoxy ester resin (A). Then, 2377.8 parts by weight of ion-exchanged water was gradually added to the solution while stirring to conduct the phase inversion emulsification. After the phase inversion emulsification was completed, 933 parts by weight of water and methyl isobutyl ketone were removed under reduced pressure to obtain a brown emulsion from which methyl isobutyl ketone was removed. Filtration using a 200 mesh was conducted after pH of the emulsion was adjusted to pH 8.7 by using a 25% by weight aqueous ammonia, and a resin composition for water paint (p-1) (non-volatile contents: 36% by weight, acid value: 34 (mgKOH/g), pH 8.7) of the present invention was obtained.

Measurement of the number average molecular weight of non-volatile content, and evaluations of an organic-solvent content and water dispersibility of the obtained resin composition for water paint (p-1) of the present invention were conducted as follows.

(Evaluation Method of Water Dispersibility)

Water dispersibility was evaluated in accordance with the following criteria based on the appearance observation and the results of the viscosity measurement, which were conducted after storage of a resin composition for water paint for one month at 40° C.

○: No precipitate, and non increase of the viscosity or small increase of the viscosity which is less than two times of the initial viscosity Δ: No precipitate, and there is an increase of the viscosity which is two times or more of the initial viscosity X: Precipitate is generated (Evaluation Method of Content of an Organic-Solvent)

The contents of an organic solvent included in the resin composition for water paint was measured with a gas chromatogram (QP-5050A, manufactured by Shimadzu Corporation) and evaluated in accordance with the following criteria.

⊚: Less than 0.1% by weight

○: 0.1% by weight or more and less than 3.0% by weight

Δ: 3.0% by weight or more and less than 10% by weight

X: 10% by weight or more (Measurement Method of the Number Average Molecular Weight)

The number average molecular weight of a non-volatile content included in the resin composition for water paint was evaluated with high performance gel permeation chromatography (HLC-8220GPC, manufactured by Tosoh Corporation) under the conditions that the temperature was 40° C. and the flow velocity was 1 ml/min.

Example 2

Production until the phase inversion emulsification step was carried out similar to Example 1, except that a vinyl monomer, an organic solvent, a basic compound and the like were changed to those described in following Table 1. After the phase inversion emulsification was completed, 939 parts by weight of water and methyl isobutyl ketone were removed to obtain a brown emulsion from which methyl isobutyl ketone was removed. After pH of the emulsion was adjusted to pH 8.5 by using 25% by weight aqueous ammonia, filtration using a 200 mesh was conducted to obtain a resin composition for water paint (p-2) of the present invention (non-volatile contents: 36% by weight, acid value of a vinyl-modified epoxy ester resin before neutralization (A1): 23 (mgKOH/g), pH 8.5).

Evaluations of an organic-solvent content, water dispersibility and the number average molecular weight of a non-volatile content were conducted similar to Example 1 except that the obtained resin composition for water paint (p-2) of the present invention was used.

Example 3

Production until the phase inversion emulsification step was carried out similar to Example 1 except that a vinyl monomer, an organic solvent, a basic compound and the like were changed to those described in Table 1. After the phase inversion emulsification was completed, 939 parts by weight of water and methyl isobutyl ketone were removed to obtain a brown emulsion from which methyl isobutyl ketone was removed. After pH of the emulsion was adjusted to pH 8.5 by using 25% by weight aqueous ammonia, filtration using a 200 mesh was conducted to obtain a resin composition for water paint (p-3) of the present invention (non-volatile contents: 36% by weight, acid value of the vinyl-modified epoxy ester resin before neutralization (A1): 34 (mgKOH/g), pH 8.5).

Evaluations of an organic-solvent content, water dispersibility and the number average molecular weight of a non-volatile content were conducted similar to Example 1 except that the obtained resin composition for water paint (p-3) of the present invention was used.

Comparative Example 1

Similar to Example 1, a phase inversion emulsification was conducted except that a vinyl monomer, an organic solvent, a basic compound and the like were changed to those described in Table 1 to obtain a brown emulsion which includes 12.9% by weight of propylene glycol monoisopropyl ether as an organic solvent. Then, after adjusting pH of the emulsion to pH 8.7 using dimethyl ethanolamine, 1468.5 parts by weight of ion exchanged water was added thereto gradually while stirring to obtain a brown emulsion by a phase inversion emulsification. Then, filtration thereof using a 200 mesh was conducted to obtain a resin composition for water paint (p-4) (non-volatile contents: 36% by weight, acid value of a vinyl-modified epoxy ester resin before neutralization: 35 (mgKOH/g), pH 8.7), which was prepared for comparison. Comparative Example 1 was an example wherein a resin composition for water paint was prepared based on Patent Document 1.

Evaluations of an organic-solvent content, water dispersibility and the number average molecular weight of a non-volatile content were conducted similar to Example 1 except that the obtained resin composition for water paint (p-4) for comparison was used. Result thereof are shown in Table 1.

Comparative Example 2

Production until the phase inversion emulsification step was carried out similar to Example 1 except that a vinyl monomer, an organic solvent, a basic compound and the like were changed to those described in Table 1. After the phase inversion emulsification was completed, 939 parts by weight of water and methyl isobutyl ketone were removed to obtain a white solution in which methyl isobutyl ketone was removed and aggregates were observed. After pH of the solution was adjusted to pH 8.7 by using 25% by weight aqueous ammonia, filtration using a 200 mesh was conducted to obtain a resin composition for water paint (p-5) (non-volatile content: 36% by weight, acid value of the vinyl-modified epoxy ester resin before neutralization: 35 (mgKOH/g), pH could not be evaluated correctly since the solution to be evaluated included aggregates), which was prepared for comparison. The Comparative Example 2 was an example wherein a resin composition for water paint was prepared based on Patent Document 1 but methyl isobutyl ketone was removed under reduced pressure.

Evaluations of an organic-solvent content, water dispersibility and the number average molecular weight of a non-volatile content were conducted similar to Example 1 except that the obtained resin composition for water paint (p-5) for comparison was used. Result thereof are shown in Table 1.

Comparative Example 3

Production until the phase inversion emulsification step was carried out similar to Example 1 except that a vinyl monomer, an organic solvent, a basic compound and the like were changed to those described in Table 1. After the phase inversion emulsification was completed, 939 parts by weight of water and methyl isobutyl ketone were removed to obtain a brown emulsion from which almost all methyl isobutyl ketone was removed. Then, after pH of the solution was adjusted to pH 8.5 by using 25% by weight aqueous ammonia, filtration using a 200 mesh was conducted to obtain a resin composition for water paint (p-6) used for comparison (non-volatile contents: 36% by weight, acid value of the vinyl-modified epoxy ester resin before neutralization: 60 (mgKOH/g), pH 8.5). The Comparative Example 3 was an example wherein a resin composition for water paint was prepared to improve the water dispersibility of a resin composition for water paint of the Comparative Example 2.

Evaluations of an organic-solvent content, water dispersibility and the number average molecular weight of a non-volatile content were conducted similar to Example 1 except that the obtained resin composition for water paint (p-6) for comparison was used. Result thereof are shown in Table 1.

Comparative Example 4

In a four-necked flask equipped with a thermometer, a stirrer, a thermoregulator and a nitrogen introduction tube, 185 parts by weight of ion exchanged water was added and heated to 80° C. Then, a monomer solution comprising 20 parts by weight of ARONIX M 5300, 5.9 parts by weight of dimethyl ethanolamine and 80 parts by weight of styrene was added to the flask dropwise over two hours. An initiator solution was also added to the flask dropwise and simultaneously with the monomer solution, wherein the initiator solution was prepared by neutralizing 1 part of 4,4-azobis-4-cyano valeric acid with a 0.55 parts by weight of dimethyl ethanolamine and dissolving the neutralized product in 40 parts by weight of ion-exchanged water. Then, the mixture was stirred at 80° C. for five hours and then cooled to obtain a resin composition for water paint (p-7). The Comparative Example 4 was an example of a resin composition for water paint which was prepared in accordance with Patent Document 2.

Evaluations of an organic-solvent content, water dispersibility and the number average molecular weight of a non-volatile content were conducted similar to Example 1 except that the obtained resin composition for water paint (p-7) for comparison was used.

Comparative Example 5

A resin composition for water paint (p-8) was prepared similar to Comparative Example 4 except that a vinyl monomer, an organic solvent, a basic compound and the like were changed to those described in Table 2. Comparative Example 5 was an example wherein a resin composition for water paint which had a lower glass transition point was prepared in order to enable the resin composition for water paint of the Comparative Example 4 to be allowed to form a film at ordinary temperature.

Evaluations of an organic-solvent content, water dispersibility and the number average molecular weight of a non-volatile content were conducted similar to Example 1 except that the obtained resin composition for water paint (p-8) for comparison was used. Results thereof are shown in Table 2.

Comparative Example 6

A resin composition for water paint (p-9) was prepared similar to Comparative Example 4 except that a vinyl monomer, an organic solvent, a basic compound and the like were changed to those described in Table 2. Comparative Example 6 was an example wherein a resin composition for water paint which had a lower molecular weight was prepared in order to enable the molecular weight of the resin composition for water paint of the Comparative Example 5 to be measured.

Evaluations of an organic-solvent content, water dispersibility and the number average molecular weight of a non-volatile content were conducted similar to Example 1 except that the obtained resin composition for water paint (p-9) for comparison was used. Results thereof are shown in Table 2.

TABLE 1

| | | Example | | | Comparative Example | | |
|---|---|---|---|---|---|---|---|
| | | 1 | 2 | 3 | 1 | 2 | 3 |
| Dehydrated-castor-oil fatty acid | Parts by weight | 160.0 | 160.0 | 160.0 | 160.0 | 160.0 | 160.0 |
| Soybean oil fatty acid | | 161.0 | 161.0 | 161.0 | 161.0 | 161.0 | 161.0 |
| EPICLON 1050 | | 322.0 | 322.0 | 322.0 | 322.0 | 322.0 | 322.0 |
| Triethylamine | | 0.3 | 0.3 | 0.3 | 0.3 | 0.3 | 0.3 |
| Maleic anhydride | | 7.0 | 7.0 | 7.0 | 7.0 | 7.0 | 7.0 |
| Methyl isobutyl ketone | | 293.0 | 293.0 | 293.0 | | 293.0 | 293.0 |
| Propylene glycol monopropyl ether | | | | | 293.0 | | |
| ARONICS M-5300 | | 160.0 | 100.0 | 50.0 | | | |
| Acrylic acid | | | | 26.0 | 38.0 | 38.0 | 70.5 |
| Styrene | | 95.0 | 100.0 | 137.0 | 156.0 | 156.0 | 139.8 |

TABLE 1-continued

|  | Example | | | Comparative Example | | |
| --- | --- | --- | --- | --- | --- | --- |
|  | 1 | 2 | 3 | 1 | 2 | 3 |
| Isobutyl methacrylate | 95.0 | 100.0 | 137.0 | 156.0 | 156.0 | 139.7 |
| M-230G |  | 50 |  |  |  |  |
| t-butyl peroxy benzoate | 20.0 | 20.0 | 20.0 | 20.0 | 20.0 | 20.0 |
| Methyl isobutyl ketone | 20.0 | 20.0 | 20.0 |  | 20.0 | 20.0 |
| Propylene glycol monopropyl ether |  |  |  | 20.0 |  |  |
| 25% by weight aqueous ammonia | 88.0 | 61.0 | 88.0 |  | 88.0 | 112.0 |
| Dimethyl ethanolamine |  |  |  | 57.0 |  |  |
| Ion-exchanged water | 2377.8 | 2377.8 | 2377.8 | 1468.5 | 2377.8 | 2377.8 |
| Resin compositions for water paint | p-1 | p-2 | p-3 | p-4 | p-5 | p-6 |
| Non-volatile contents (% by weight) | 36 | 36 | 36 | 36 | 36 | 36 |
| pH | 8.7 | 8.5 | 8.5 | 8.7 | Evaluation impossible | 8.5 |
| Number average molecular weight | 5,200 | 5,100 | 5,300 | 4,900 | 4,800 | 4,500 |
| Evaluation results of water dispersibility | ◯ | ◯ | ◯ | ◯ | X | ◯ |
| Contents of organic solvents | ◉ | ◉ | ◉ | X | ◉ | ◉ |

TABLE 2

|  |  | Comparative Example | | |
| --- | --- | --- | --- | --- |
|  |  | 4 | 5 | 6 |
| Ion-exchanged water | Parts by weight | 185.0 | 185.0 | 185.0 |
| ARONICS M-5300 |  | 20.0 | 20.0 | 20.0 |
| Dimethyl ethanolamine |  | 5.9 | 5.9 | 5.9 |
| Styrene |  | 80.0 | 16.0 | 16.0 |
| Butyl methacrylate |  |  | 46.1 | 46.1 |
| Butyl acrylate |  |  | 17.9 | 17.9 |
| Lauryl mercaptan |  |  |  | 0.5 |
| 4,4-Azobis-4-cyano valeric acid |  | 1.0 | 1.0 | 1.0 |
| Dimethyl ethanolamine |  | 0.55 | 0.55 | 0.55 |
| Ion exchanged water |  | 40.0 | 40.0 | 40.0 |
| Resin composition for water paint |  | p-7 | p-8 | p-9 |
| Non-volatile contents (% by weight) |  | 29 | 28.2 | 28.9 |
| pH |  | 8.7 | 8.7 | 8.8 |
| Number average molecular weight |  | Evaluation impossible | Evaluation impossible | 25,000 |
| Evaluation results of water dispersibility |  | ◯ | ◯ | ◯ |
| Contents of organic solvent |  | ◯ | ◯ | ◯ |

EPICLON 1050 is a bisphenol A type epoxy resin manufactured by Dainippon Ink and Chemicals Incorporated, wherein the epoxy equivalent thereof is 475 g/equivalent.

ARONIX M 5300 is an acrylic monomer manufactured by Toagosei co., Ltd., which has a functional group represented by the aforementioned general formula (I) wherein n=2 and $R^1$ is an alkylene group having 5 carbons.

M-230G is a methoxy polyethylene glycol methacrylate manufactured by Shin-Nakamura Chemical Co., Ltd (the average number of repetitions of an ethylene oxide structure: 23).

Example 4

69.4 parts by weight of the resin composition for water paint (p-1) obtained in Example 1 was mixed with 20 parts by weight of titanium oxide (TIPAQUE R930, manufactured by Ishihara Sangyo Kaisha, Ltd.), 30 parts by weight of calcium carbonate (Homocal D, manufactured by Shiraishi Kogyo Kisha., Ltd.) and 0.5% by weight of a deforming agent (SM DEFOAMER 77, manufactured by San Nopco Limited) and milled for thirty minutes with a sand mill to obtain a milling base. Subsequently, 69.4 parts by weight of the resin composition for water paint (p-1), 0.5 parts by weight of a leveling agent (BYK-346, manufactured by BYK-Chemie KK), 0.5% by weight of a leveling agent (BYK-381, manufactured by BYK-Chemie KK) and 0.8% by weight of a drier (DICNATE 3111, manufactured by Dainippon Ink and Chemicals Incorporated) were added to the milling base, and further mixed with a homodisper to prepare a water paint.

Subsequently, pigment dispersibility of the water paint obtained, and the water resistance and corrosion resistance of a film formed from the water paint were evaluated as described below. Results are shown in Table 3.

(Evaluation Method of Pigment Dispersibility)

A water paint was maintained for seven days at 25° C., and then, the degree of precipitation of pigment thereof was observed and whether the precipitated pigment could be dispersed again was examined. Evaluation was conducted in accordance with the following criteria.

◉: There is no precipitation of pigment

◯: A clear layer was generated at the top position of the water paint

Δ: Precipitated pigments were observed at the bottom of dispersing pigments. The precipitated pigments were able to be dispersed by hand-stirring X: Precipitated pigments were observed at the bottom of dispersing pigments. The precipitated pigments were not able to be dispersed by hand-stirring (Evaluation Method of the Water Resistance of a Film)

A water paint was coated on a degreased iron plate (SPCC-SD plate, manufactured by Nippon Testpanel Co., Ltd) with a bar coater such that the film thickness after drying was 30 μm. Subsequently, the plate was dried for seven days at ordinary temperature to prepare a coated plate used as a test plate. The test plate was immersed under water at ordinary temperature for three days, and the appearance of the plate after immersion was observed. Evaluation was conducted in accordance with the following criteria.

◉: No variation of a film

◯: Very slight blistering of a film was observed

Δ: Blistering of a film was observed

X: Blistering and peeling of a film were observed (Evaluation Method of the Corrosion Resistance)

Two cut lines which crossed each other were provided on a coated film of the test plate using a cutter so that the cut lines were reached the iron plate as a substrate. Then, a sodium chloride aqueous solution wherein the concentration thereof at the temperature of 35° C. was a 5% by weight was ejected to the coated plate on which the cut lines were provided with a spraying apparatus defined by JIS Z2371 for 125 hours. After the ejection was completed, the plate was washed with water and dried for 2 hours. Cellophane adhesive tape was pasted on the dried plate, and then it was peeled off. The peeled degree of the film after peeling was evaluated by using the following criteria. A peeled width described in the following evaluation means a width which is determined as the length from the center of the crossed lines to a portion to which a film was peeled off.

⊚: A peeled width evaluated in the peeling test was less than 1 mm.

○: A peeled width evaluated in the peeling test was 1 mm or more and less than 2 mm.

Δ: A peeled width evaluated in the peeling test was 2 mm or more and less than 4 mm.

X: A peeled width evaluated in the peeling test was 4 mm or more.

Examples 5 and 6 and Comparative Examples 4 to 8

Water paints were prepared similar to Example 4 except that resin compositions for water paint (p-2) to (p-4) and (p-6) to (p-9) were used as those described in Tables 3 and 4 instead of the resin composition for water paint (p-1). The resin composition for water paint (p-5) was not used to prepare a water paint since water dispersibility thereof was poor.

Subsequently, the pigment dispersibility of the water paints, and the water resistance and corrosion resistance of films prepared using the water paints were evaluated similar to Example 4 except that each water paint prepared was used. Results thereof are shown in Tables 3 and 4.

TABLE 3

| Table 3 | | | Example | | | Comparative Example | |
|---|---|---|---|---|---|---|---|
| | | | 4 | 5 | 6 | 4 | 5 |
| Resin composition for water paint | p-1 p-2 p-3 p-4 p-6 | Parts by weight | 138.8 | 138.8 | 138.8 | 138.8 | 138.8 |
| TIPAQUE R930 | | | 20 | 20 | 20 | 20 | 20 |
| HOMOCAL D | | | 30 | 30 | 30 | 30 | 30 |
| SN DEFOAMER 777 | | | 0.5 | 0.5 | 0.5 | 0.5 | 0.5 |
| BYK-346 | | | 0.5 | 0.5 | 0.5 | 0.5 | 0.5 |
| BYK-381 | | | 0.5 | 0.5 | 0.5 | 0.5 | 0.5 |
| DICNATE 3111 | | | 0.8 | 0.8 | 0.8 | 0.8 | 0.8 |
| Water | | | | 2 | 1 | 3 | 2 |
| PWC (% by weight) | | | 46.4 | 47.9 | 49.0 | 54.7 | 47.6 |
| Non-volatile contents (% by weight) | | | 55.3 | 53.0 | 52.1 | 46.1 | 53.3 |
| Pigment dispersibility | | | ○ | ⊚ | ○ | Δ | Δ |
| Water resistance | | | ○ | ○ | ○ | ○ | Δ |
| Corrosion resistance | | | ○ | ⊚ | ○ | ○ | Δ |

TABLE 4

| | | | Comparative Example | | |
|---|---|---|---|---|---|
| | | | 6 | 7 | 8 |
| Resin composition for water paint | p-7 p-8 p-9 | Parts by weight | 172.4 | 177.3 | 173.0 |
| TIPAQUE R930 | | | 20 | 20 | 20 |
| HOMOCAL D | | | 30 | 30 | 30 |
| SM DEFOAMER 777 | | | 0.5 | 0.5 | 0.5 |
| BYK-346 | | | 0.5 | 0.5 | 0.5 |
| BYK-381 | | | 0.5 | 0.5 | 0.5 |
| DICNATE 3111 | | | 0.8 | 0.8 | 0.8 |
| Water | | | 2 | 2 | 2 |
| PWC (% by weight) | | | 50 | 50 | 50 |
| Non-volatile contents (% by weight) | | | 44.1 | 43.2 | 44.0 |
| Pigment dispersibility | | | X | X | Δ |
| Water resistance | | | Film was not formed | Δ | X |
| Corrosion resistance | | | Film was not formed | X | X |

TIPAQUE R930 is a titanium oxide, manufactured by Ishihara Sangyo Kaisha, Ltd.

HOMOCAL D is calcium carbonate, manufactured by Shiraishi Kogyo Kisha., Ltd.

SN DEFOAMER 777 is a defoaming agent, manufactured by San Nopco Limited.

BYK-346 is a leveling agent, manufactured by BYK-Chemie KK

BYK-381 is a leveling agent, manufactured by BYK-Chemie KK

DICNATE 3111 is a drier, manufactured by Dainippon Ink and Chemicals Incorporated.

The invention claimed is:

1. A resin composition for water paint comprising: the resin composition which includes water and a vinyl-modified epoxy ester resin (A), the resin (A) includes a fatty acid chain to which a vinyl polymer portion is combined, the vinyl polymer portion comprises a structure which includes a carboxyl group at the terminal end represented by general formula (I)

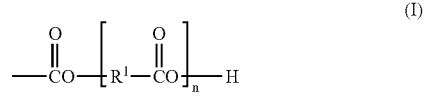

(in the formula, n represents a number of 1 to 10, and $R^1$ represents an alkylene group having 2 to 18 carbon atoms), and part of or all of the structure which includes a carboxyl group at the terminal end represented by the general formula (I) is neutralized with a basic compound, the vinyl polymer portion of the vinyl-modified epoxy ester resin (A) also comprises a polyalkylene oxide structure represented by general formula (II)

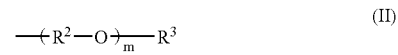

(in the general formula, m represents a number of 3 to 90, $R^2$ represents an alkylene group having 2 to 4 carbon atoms and $R^3$ represents a hydrogen atom or a methyl group).

2. The resin composition for water paint according to claim 1, wherein the vinyl-modified epoxy ester resin (A) is a resin which is obtained by neutralizing a vinyl-modified epoxy ester resin having an acid value of 15 to 40 with a basic compound.

3. The resin composition for water paint according to claim 1, wherein said structure is a structure which includes a carboxyl group at the terminal end represented by the general formula (I) wherein n represents 2 and $R^1$ represents an alkylene group having 5 carbon atoms.

4. The resin composition for water paint according to claim 1, wherein the weight ratio of the structure having a carboxyl group at the terminal end represented by the general formula (I), wherein part or all of the structure is neutralized by a basic compound, in the vinyl-modified epoxy ester resin (A) is 0.5 to 22% by weight.

5. The resin composition for water paint according to claim 1, wherein the weight ratio of the polyalkylene oxide structure represented by the general formula (II) in the vinyl-modified epoxy ester resin (A) is 1 to 10% by weight.

6. The resin composition for water paint according to claim 1, wherein the vinyl-modified epoxy ester resin (A) has a number average molecular weight of 1,000 to 10,000.

7. The resin composition for water paint according to claim 1, wherein the resin composition for water paint comprises an organic solvent in addition to water and the vinyl-modified epoxy ester resin (A), and the content of the organic solvent is up to 3% by weight.

8. The resin composition for water paint according to claim 1, wherein the vinyl-modified epoxy ester resin (A) is a resin obtained by polymerizing:
a vinyl monomer which has a structure having a carboxyl group at the terminal end represented by the general formula (I) and another vinyl monomer with
part of or all of an unsaturated bond of an unsaturated fatty acid modified epoxy ester resin, which is obtained by reacting a carboxyl group contained in an unsaturated fatty acid with an epoxy group or both of an epoxy group and a hydroxyl group of an epoxy resin.

9. A water paint which comprises a pigment and the resin composition for water paint according to claim 1.

10. A production method for a resin composition for water paint, which comprises:
preparing an organic solvent solution of a vinyl-modified epoxy ester resin (A1), wherein an unsaturated fatty acid-modified epoxy ester resin is obtained by reacting a carboxyl group contained in an unsaturated fatty acid with an epoxy group or both of an epoxy group and a hydroxyl group contained in an epoxy resin, and part of or all of an unsaturated bond of the unsaturated fatty acid-modified epoxy ester resin is polymerized with a vinyl monomer (a1) which has a structure having a carboxyl group at the terminal end represented by the following general formula (I) and another vinyl monomer (a2) to form the vinyl-modified epoxy ester resin (A1)

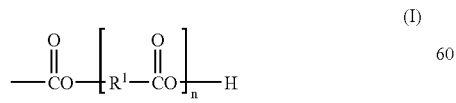

(in the formula, n represents a number of 1 to 10, and $R^1$ represents an alkylene group having 2 to 18 carbon atoms), the vinyl-modified epoxy ester resin (A1) is a resin which is produced by using, as part of or all of said other vinyl monomer (a2), a vinyl monomer which includes a polyalkylene oxide structure represented by general formula (II)

(in the general formula, m represents a number of 3 to 90, $R^2$ represents an alkylene group having two to four carbons and $R^3$ represents a hydrogen atom or a methyl group);
using a basic compound and water in addition to the organic solvent solution, conducting neutralization of part of or all of a carboxyl group of the vinyl-modified epoxy ester resin (A1) included in the organic solvent solution using the basic compound to form a neutralized product of the vinyl-modified epoxy ester resin (A1), and conducting mixing of water and the organic solvent solution which includes the neutralized product obtained from the vinyl-modified epoxy ester resin (A1) to conduct a phase-inversion emulsification of the neutralized product under water; and
removing part of or all of an organic solvent included in the mixture after the phase-inversion emulsification.

11. The production method for a resin composition for water paint according to claim 10, wherein the organic solvent solution of the vinyl-modified epoxy ester resin (A1) is a solution which is obtained by conducting the polymerization of part of or all of the unsaturated bond of the unsaturated fatty acid-modified epoxy ester resin with the vinyl monomer (a1) which has a structure having a carboxyl group at the terminal end represented by the following general formula (I) and another vinyl monomer (a2) in an organic solvent.

12. The production method for a resin composition for water paint according to claim 10, wherein the basic compound is aqueous ammonia.

13. The production method for a resin composition for water paint according to claim 10, wherein the vinyl-modified epoxy ester resin (A1) has an acid value of 15 to 40.

14. The production method for a resin composition for water paint according to claim 10, wherein said structure is a structure having a carboxyl group at the terminal end represented by the general formula (I) wherein n represents 2 and $R^1$ represents an alkylene group having 5 carbon atoms.

15. The production method for a resin composition for water paint according to claim 10, wherein the weight ratio of the structure having a carboxyl group at the terminal end represented by the general formula (I), wherein part or all of the structure is neutralized by the basic compound, in the vinyl-modified epoxy ester resin (A) is 0.5 to 22% by weight.

16. The production method for a resin composition for water paint according to claim 10, wherein the organic solvent is removed from the mixture until the content of the organic solvent therein becomes up to 3% by weight.

17. A production method for a resin composition for water paint, which comprises:
preparing an organic solvent solution of a vinyl-modified epoxy ester resin (A1), wherein an unsaturated fatty acid-modified epoxy ester resin is obtained by reacting a carboxyl group contained in an unsaturated fatty acid with an epoxy group or both of an epoxy group and a hydroxyl group contained in an epoxy resin, and part of or all of an unsaturated bond of the unsaturated fatty acid-modified epoxy ester resin is polymerized with a vinyl monomer (a1) which has a structure having a carboxyl group at the terminal end represented by the following general formula (I) and another vinyl monomer (a2) to form the vinyl-modified epoxy ester resin (A1)

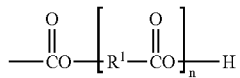

(in the formula, n represents a number of 2, and $R^1$ represents an alkylene group having 5 carbon atoms);

using a basic compound and water in addition to the organic solvent solution, conducting neutralization of part of or all of a carboxyl group of the vinyl-modified epoxy ester resin (A1) included in the organic solvent solution using the basic compound to form a neutralized product of the vinyl-modified epoxy ester resin (A1), and conducting mixing of water and the organic solvent solution which includes the neutralized product obtained from the vinyl-modified epoxy ester resin (A1) to conduct a phase-inversion emulsification of the neutralized product under water; and removing part of or all of an organic solvent included in the mixture after the phase-inversion emulsification.

* * * * *